Oct. 5, 1926.

W. S. CRAINE 1,601,998

GAUGE FOR AUTOMOBILE RADIATORS

Filed May 13, 1925

Inventor
W. S. Craine

Attorney

Patented Oct. 5, 1926.

1,601,998

UNITED STATES PATENT OFFICE.

WILLIAM S. CRAINE, OF DETROIT, MICHIGAN.

GAUGE FOR AUTOMOBILE RADIATORS.

Application filed May 13, 1925. Serial No. 30,075.

This invention relates to improvements in measuring devices, and is more particularly adapted to an improved gauge for radiators of motor vehicles.

One of the important objects of the present invention is to provide a gauge of the above mentioned character which is of such a construction as to enable the operator of the motor vehicle to readily ascertain the amount of water in the radiator without having to leave his seat.

A further object is to provide a gauge of the above mentioned character which will, at all times, be positive and efficient in carrying out the purposes for which it is designed, the same being further simple in construction, inexpensive, strong and durable.

Other objects and advantages of the invention will become apparent during the course of the following detailed description.

In the accompanying drawing:—

Figure 1:
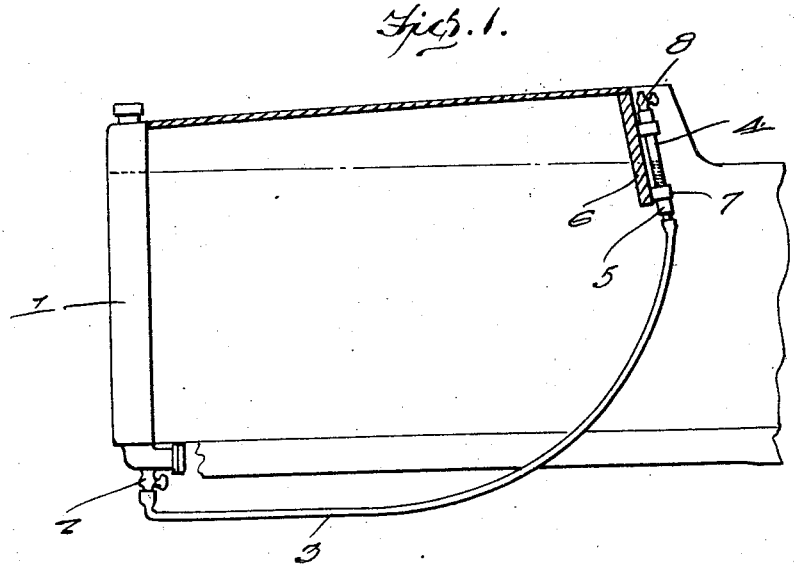
Figure 2:
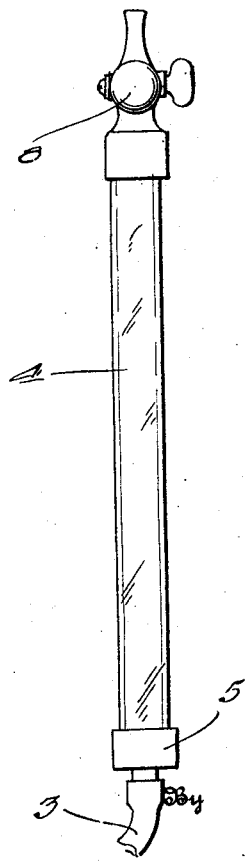

Figure 1 is a side elevation of the gauge embodying my invention, showing the same installed on an automobile, and Figure 2 is an enlarged side elevation of the gauge tube forming a part of the present invention.

In the drawing, wherein for the purpose of illustration is shown the preferred embodiment of my invention, the numeral 1 designates the radiator of a motor vehicle, the same being of any well known construction and provided at its bottom with the usual drain cock 2. Attached at one end to the drain cock 2 is the rubber hose 3.

The rubber hose 3 extends rearwardly under the engine of an automobile, and upwardly through the floor board thereof and is attached at its opposite end to the lower end of the glass gauge tube 4 through the medium of the nipple 5, which is associated with the lower end of the glass gauge tube.

The glass gauge tube is adapted to be supported on the dash board 6 of the automobile, and any suitable clamping means such as is illustrated at 7 is provided for securing the gauge tube in position on the dash board of the automobile. A pet cock 8 is provided at the upper end of the glass gauge tube and the purpose thereof will hereinafter be more fully described.

In order to render the gauge operative, the drain cock 2 of the radiator 1 is open, and in this manner, the water from the radiator will flow through the hose 3 into the glass gauge tube 4. The water will rise in the gauge tube 4 to the same level as water in the upper water chamber of the radiator, so that the level of the water in the radiator may be ascertained by observing the gauge 4. As the latter is supported on the instrument board of the automobile, the operator will, at all times, be able to observe the gauge without necessitating his leaving his seat.

When the pet cock 8 arranged on the upper end of the glass gauge tube 4 is open, a vent is provided for the tube. The petcock will permit the air to escape when open and allow the water from the radiator to seek its level in the glass tube and furthermore when the pet cock is closed, the same will prevent any possibility of an overflow of water from the radiator when the car is ascending a steep grade.

The provision of a gauge of the above mentioned character, enables the same to be readily and easily installed on an automobile without necessitating any material alterations of the latter and will, at all times, be positive and efficient in carrying out the purposes for which it is designed.

While I have shown the gauge as positioned on the instrument board of the automobile, it is to be understood that the same may be located at any other suitable place, whereby the operator may easily observe the gauge, I do not wish to limit myself to the particular manner in which the gauge is arranged on the automobile While I have shown the preferred embodiment of the invention, it is to be understood, that various changes in the size, shape, and arrangement of parts may be resorted to, without departing from the spirit of the invention or the scope of the appended claim.

Having thus described my invention, what I claim as new is:—

The combination with the radiator of an automobile including the usual drain cock thereof; of a gauge for the radiator comprising a sight tube adapted to be supported on the instrument board of the autobile, a rubber hose attached at one end to the drain cock, a nipple on one end of the sight tube, the other end of the rubber hose being connected to said nipple, whereby communication between the sight tube and the radiator is afforded, and a pet cock associated with the opposite end of the sight tube, providing a means when closed to prevent the overflow of the water from the sight tube when the automobile is ascending a steep grade, the pet cock further providing a vent for the tube when the same is opened.

In testimony whereof I affix my signature.

WILLIAM S. CRAINE.